(12) United States Patent
Bodley et al.

(10) Patent No.: US 9,276,667 B2
(45) Date of Patent: Mar. 1, 2016

(54) SYSTEMS AND METHODS FOR WIRELESS AUDIO CONFERENCING

(75) Inventors: Martin R. Bodley, Sudbury, MA (US); Jean-Pierre Carney, Sudbury, MA (US); Mark Andrew DesMarais, Northborough, MA (US); Joshua Hallock Wilkie, Burlington, MA (US)

(73) Assignee: RevoLabs, Inc., Sudbury, MA (US)

( * ) Notice: Subject to any disclaimer, the term of this patent is extended or adjusted under 35 U.S.C. 154(b) by 277 days.

(21) Appl. No.: 13/983,625

(22) PCT Filed: Feb. 22, 2012

(86) PCT No.: PCT/US2012/026202
§ 371 (c)(1),
(2), (4) Date: Aug. 5, 2013

(87) PCT Pub. No.: WO2012/116123
PCT Pub. Date: Aug. 30, 2012

(65) Prior Publication Data
US 2013/0316752 A1  Nov. 28, 2013

Related U.S. Application Data

(60) Provisional application No. 61/445,342, filed on Feb. 22, 2011.

(51) Int. Cl.
*H04B 7/00* (2006.01)
*H04B 7/26* (2006.01)
*H04L 12/12* (2006.01)
*H04L 12/18* (2006.01)

(52) U.S. Cl.
CPC *H04B 7/26* (2013.01); *H04L 12/12* (2013.01); *H04L 12/1827* (2013.01); *H04L 12/189* (2013.01)

(58) Field of Classification Search
CPC .................................. H04B 7/26; H04L 12/12
USPC ........ 455/463, 416, 517, 518, 520, 415, 41.2, 455/573
See application file for complete search history.

(56) References Cited

U.S. PATENT DOCUMENTS

| | | | |
|---|---|---|---|
| 8,457,614 B2 * | 6/2013 | Bernard et al. | 455/416 |
| 2005/0153716 A1 * | 7/2005 | Bodley | 455/463 |
| 2006/0132595 A1 * | 6/2006 | Kenoyer et al. | 348/14.08 |
| 2014/0335838 A1 * | 11/2014 | Root | 455/416 |

* cited by examiner

*Primary Examiner* — John J Lee
(74) *Attorney, Agent, or Firm* — Robert Schuler (57) ABSTRACT

Systems and methods for wireless audio conferencing are described herein. In one embodiment, a wireless audio conferencing system is provided that includes a base unit configured to interface with a plurality of external communication systems, one or more wireless speakers, one or more wireless microphones, a handset configured to wirelessly control the base unit, and a charger tray separate from the base unit and configured to removably store and recharge the one or more wireless speakers, the one or more wireless microphones, and the handset. The one or more wireless speakers and the one or more wireless microphones are configured to communicate with the base unit to provide audio conferencing between a plurality of users. The systems and methods described herein can provide a high quality and adaptable audio conferencing system for use with a variety of communications systems.

14 Claims, 6 Drawing Sheets

SYSTEMS AND METHODS FOR WIRELESS AUDIO CONFERENCING

FIELD

The present invention relates to systems and methods for wireless audio conferencing.

BACKGROUND

Audio conferencing has grown in popularity. Commonly, audio systems use a tabletop microphone to detect input from conference participants. Participants must therefore gather relatively close to the microphone in order to assure audio quality, and also must always be aware of the direction in which they are speaking. As a result, such systems intrude on the meeting. In addition, as the microphones are omni-directional and located on the tabletop, they can pick up and transmit to the remote participants undesirable ambient noise. Common sources of unwanted ambient noise include table noise, sidebar conversations, laptop keyboard clicks, coffee cup clinks, etc. These undesired audio sources can be very damaging to the efficiency, focus, and productivity of conference meetings, especially for far-end (remote) participants in the conference.

To avoid the use of a single tabletop microphone, conference participants are commonly faced with installing custom conferencing equipment in a particular room. This can be undesirable as well, however, because the custom equipment can be very expensive and is hard wired in a particular room configuration.

Accordingly, there is a need for a simple, adaptable, and modular audio conferencing system that can be easily deployed in a variety of settings and modified to fit a particular configuration of a room and/or participants. Further, there is a need for a system having a simple user interface and the ability to bridge across a variety of existing communication systems or protocols.

SUMMARY

Systems and methods for wireless audio conferencing that address the problems discussed above are provided herein. In one embodiment, a wireless audio conferencing system is provided that includes a base unit configured to interface with a plurality of external communication systems, one or more wireless speakers, one or more wireless microphones, a handset configured to wirelessly control the base unit, and a charger tray separate from the base unit and configured to removably store and recharge the one or more wireless speakers, the one or more wireless microphones, and the handset, wherein the one or more wireless speakers and the one or more wireless microphones are configured to communicate with the base unit to provide audio conferencing between a plurality of users. The base unit and wireless speakers and microphones can provide a high quality, adaptable, and modular conferencing environment that can be used in conjunction with any of a variety of external communication systems.

The systems and methods of the present invention can have a variety of substitutions, additional features, or variations, all of which are considered within the scope of the invention. For example, in some embodiments, each of the one or more wireless speakers and the one or more wireless microphones can communicate with the base unit using a unique audio channel.

In some embodiments, the plurality of external communication systems can be selected from the group consisting of analog telephones, VOIP telephones, cellular telephones, Ethernet, USB, video conferencing, and audio recording. In certain embodiments, the base unit can be configured to interface with two or more of the plurality of external communication systems simultaneously.

In other embodiments, each of the handset and the one or more wireless microphones can include a mute button and pressing the mute button on any one device can mute the handset and all of the one or more wireless microphones. Further, in some embodiments, the handset and all of the one or more wireless microphones can be un-muted by pressing the mute button on any one device again. As a result, the mute button can act as a toggle switch to mute all the microphones in the system.

In certain embodiments, the system can be configured to answer an incoming call if the handset or any of the one or more wireless microphones is removed from the charger tray while the incoming call is ringing. The system can also be configured to answer the incoming call if any of the one or more wireless microphones already removed from the charger tray is un-muted. Further, the system can be configured to terminate a call when the handset and each of the one or more wireless microphones is placed in the charger tray.

In some embodiments, the one or more wireless microphones can be selected from the group consisting of a personal microphone, an omni-directional table-top microphone, and a directional table-top microphone.

The one or more wireless microphones and one or more wireless speakers can include a variety of combinations and numbers of each component. In certain embodiments, the one or more wireless microphones can include four wireless microphones. In other embodiments, the one or more wireless speakers can include two wireless speakers.

In another aspect of the invention, a wireless audio conferencing system is provided that includes a base unit, a plurality of wireless microphones, one or more wireless speakers, and a charger tray separate from the base unit and configured to removably store and recharge the plurality of wireless microphones and the one or more wireless speakers. The base unit is configured to wirelessly communicate with each of the plurality of wireless microphones and the one or more wireless speakers using a unique audio channel, and the base unit is configured to simultaneously connect a first portion of the plurality of wireless microphones to each other and connect a second portion of the plurality of wireless microphones to each other such that the first and second portions of the plurality of wireless microphones are not conferenced together. The base unit can, in effect, create two separate audio conferences by selectively connecting portions of the plurality of wireless microphones. In other embodiments, any of a variety of different audio conferences can be created using a plurality of wireless microphones.

In another aspect of the invention, a method of managing a wireless audio conferencing system is provided that includes determining if any of a plurality of wireless microphones is removed from a charger tray upon receipt of an incoming request for an audio conference. The method further includes initiating an audio conference through a handset if none of the plurality of wireless microphones is removed from the charger tray, and activating one or more wireless speakers and a wireless microphone upon removal of the wireless microphone from the charger tray. The method further includes terminating the audio conference when each of the plurality of wireless microphones is returned to the charger tray.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Cross Reference to Related Applications

This application claims the benefit under 35 U.S.C. 120 of PCT Application Serial No. PCT/US2012/26202, entitled "Systems and Methods for Wireless Audio Communications", filed Feb. 22, 2012; which in turn claims the benefit under 35 U.S.C. §119(e) of U.S. Provisional Patent Application Ser. No. 61/445,342 entitled "Systems and Methods for Wireless Audio Conferencing", filed Feb. 22, 2011, the entire contents of both of which are incorporated herein by reference.

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The terms "a" and "an" can be used interchangeably, and are equivalent to the phrase "one or more" as utilized in the present application. The terms "comprising," "having," "including," and "containing" are to be construed as open-ended terms (i.e., meaning "including, but not limited to,") unless otherwise noted. The terms "about" and "approximately" used for any numerical values or ranges indicate a suitable dimensional tolerance that allows the composition, part, or collection of elements to function for its intended purpose as described herein. These terms generally indicate a ±10% variation about a central value. Components described herein as being coupled may be directly coupled, or they may be indirectly coupled via one or more intermediate components. The recitation of any ranges of values herein is merely intended to serve as a shorthand method of referring individually to each separate value falling within the range, unless otherwise indicated herein, and each separate value is incorporated into the specification as if it were individually recited. All methods described herein can be performed in any suitable order unless otherwise indicated herein or otherwise clearly contradicted by context. The use of any and all examples, or exemplary language (e.g., "such as"), provided herein is intended merely to better illuminate the invention and does not impose a limitation on the scope of the invention unless otherwise claimed. No language in the specification should be construed as indicating any non-claimed element as essential to the practice of the invention.

Various exemplary systems and methods are provided for wireless audio conferencing that employ one or more wireless components. While such a wireless audio conferencing system can have a variety of configurations and components, in one exemplary embodiment, the audio conferencing system can include a base unit and one or more wireless communication modules. The base unit can operate in conjunction with the one or more wireless communication modules to create a unified communications or conferencing system that is able to connect to a variety of input sources (e.g., Bluetooth, POTS (Plain Old Telephone Service), VOIP (Voice Over Internet Protocol), video conferencing, personal computer, etc.) and provide high quality audio playback and recording using components that can easily be moved throughout a conferencing environment (e.g., a conference room) to best suit the number and location of users within the environment. Furthermore, the audio conferencing system can utilize encrypted digital communication to prevent unauthorized eavesdropping by wireless interception, and can operate in such a manner as to prevent interference with other common wireless communication devices (e.g., Wi-Fi networks, cordless phones, cellular phones, etc.). For example, in the US, the audio conferencing system can operate using the DECT 6.0 (Digital Enhanced Cordless Telecommunications) standard. Devices using this standard operate at 1.9 GHz, safely isolated from other phones and wireless networks that commonly operate at either 2.4 or 5.8 GHz.

Figure 1:
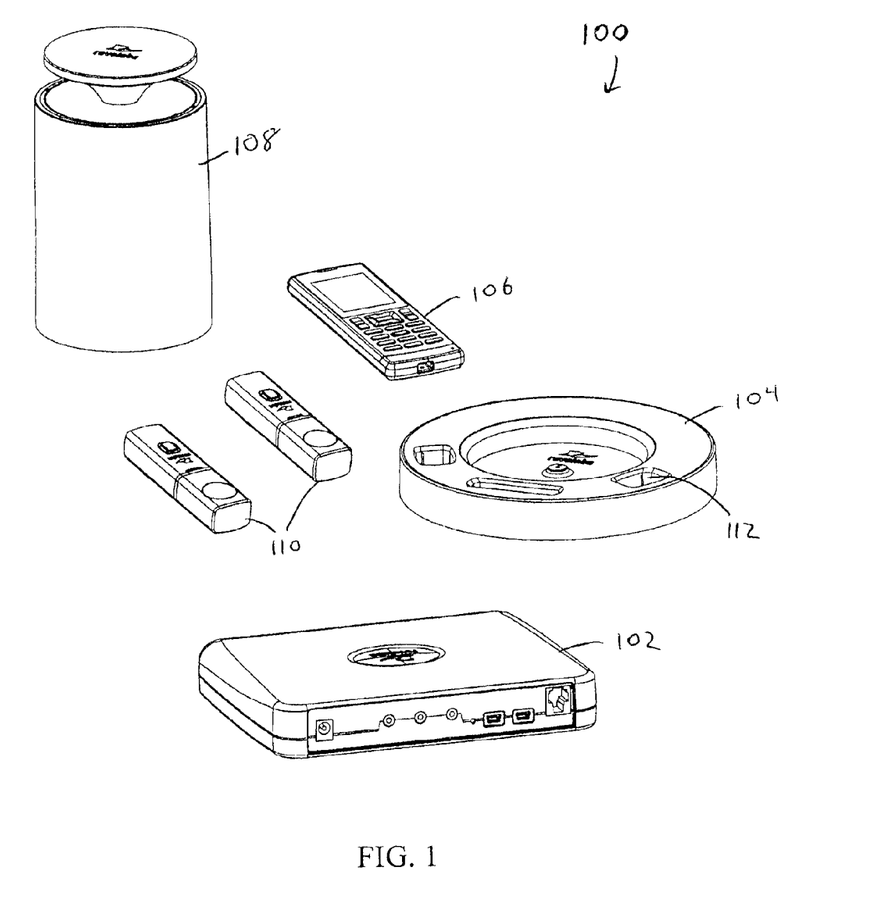
FIG. 1 is an illustration of one embodiment of a unified audio conferencing system having a base unit and one or more wireless components.

FIG. 1 illustrates one embodiment of a wireless audio conferencing system of the present invention. The system 100 includes a base station 102, a charger tray 104, and one or more communication modules. The communication modules can have a variety of forms but, generally, can be any component that can wirelessly communicate with the base unit 102 to facilitate communication between users of the audio conferencing system. While the system 100 is described below with the use of a variety of communication module types, it should be understood that the unified audio conferencing system 100 can be used with only a single type of communication module (e.g., personal microphones only, table-top speakers only, handsets only, etc.) or any combination thereof. This allows for increased flexibility in the number of users and room configurations for use with the audio conferencing systems described herein. For example, as shown in FIG. 1, in one embodiment a handset dialer 106, one or more wireless speakers 108, and one or more wireless microphones 110 can independently and simultaneously couple to the base unit 102 of the audio conferencing system 100. In particular, in some embodiments, up to two wireless microphones can connect to the base unit, while in other embodiments up to four wireless microphones can connect to the base unit. In some embodiments, a single wireless speaker connects to the base unit, while in other embodiments two wireless speakers can be connected to the base unit.

The base unit can be configured to connect to a telephone or other communication system via the inputs and/or outputs discussed below, and to connect audio conferencing users to those systems via wireless communication with the one or more speakers and microphones placed throughout the conferencing environment. The base unit 102 serves as a bridge between the wireless communication devices and the telephone or other external communication systems employed by the audio conferencing users.

Further, in some embodiments, the base unit 102 can be configured to connect to a plurality of external communication systems at the same time. For example, the base unit can be configured to connect to both a Bluetooth-enabled cellular telephone and a traditional telephone line at the same time. In such an embodiment, a user can select which external communication technology to utilize when initiating an audio conference with a remotely-located party. Exemplary external communication systems include cellular telephones via Bluetooth wireless connections, analog telephone connections, VOIP (Voice Over Internet Protocol) telephone connections, personal computers via Ethernet or USB (Universal Serial Bus), video conferencing via direct audio connection, and audio recording equipment via direct audio connection. In certain embodiments, the base unit 102 can be configured to connect to any two of these external communication systems, while in other embodiments the base unit can be configured to connect to any three of these systems, and in still other embodiments can connect to any four, any five, or all of these external systems at the same time. Users would then have the option of selecting among any of the available and connected external communication sources when initiating an audio conference.

In still other embodiments, the base unit 102 can be configured to initiate calls to remote parties using two or more of the connected external communication systems and to conference the two or more calls together, creating a single unified audio conference that bridges across communication systems. For example, a user could choose to initiate a call with a first remote party using a cellular phone connected via Bluetooth. The user could then choose to initiate a second call with a second remote party via a traditional telephone line. The user could then conference the two calls together such that the user, the first remote party, and the second remote party can all speak together.

The base unit 102 can include all the necessary software to connect to a variety of external communication systems, process input signals therefrom, deliver the input signals to audio conferencing users via, for example, one or more wireless speakers, and collect input from the audio conferencing users via, for example, one or more wireless microphones. The base unit 102 can include software to condition the audio signals before output. Examples include acoustic echo cancellation, gain control and other audio equalization processes, etc. By way of example only, the base unit 102 can include a standard audio interface, automatic audio mixing and gain control, secure and reliable RF performance, and system software/MMI that is simple to use and has sophisticated performance results. Base unit features are important in achieving a system that is simple to setup and use with any existing AN equipment or external communication systems. The use of industry standard connectors, audio levels, and naming conventions simplifies integration into existing installations. For example, the base unit 102 can automatically adjust for any communications module installed into any docking port 112 of the charger tray 104. Further, the base unit 102 can handle all of the audio multiplexing and gain adjustments, such that the audio level of each of the communication modules is equal prior to being combined and presented for output. An exemplary base unit and its functionality are described in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," and U.S. patent application Ser. No. 11/668,235 filed on Jan. 29, 2007, and entitled "Wireless Multi-User Audio System," all of which are hereby incorporated by reference in their entirety.

Figure 2:
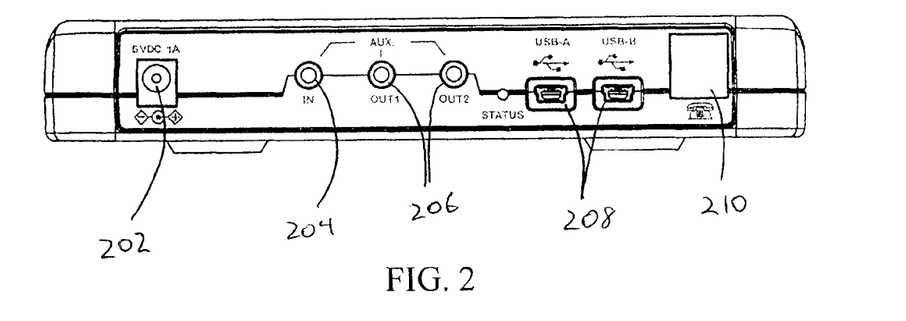
FIG. 2 is an illustration of one embodiment of a base unit having one or more input and output connections.

FIG. 2 illustrates one embodiment of a base unit 102 having a variety of input and output connectors. As shown in the figure, the base unit 102 can include a power source input 202, one or more audio inputs 204, and one or more audio outputs 206. The base unit 102 can also include one or more USB (Universal Serial Bus) connections 208, along with one or more RJ-11 telephone communication jacks 210. One skilled in the art will appreciate that the base unit 102 can include any number of other inputs and/or outputs (e.g., Ethernet, optical audio, etc.) in any of a variety of combinations.

The charger tray 104 can have a variety of configurations, but generally is configured to removably store and recharge at least one communication module. For example, as shown in FIG. 1, the charger tray 104 can include one or more docking ports 112, each of which can releasably engage, charge, and/or synchronize a communications module with the base unit 102. The ports 112 can be integrated to perform each of these functions, or the charger tray 104 can include separate ports dedicated to each function. In still other embodiments, the base unit 102 can include a docking port for synchronization and the ports 112 in the charger tray 104 can be used for storage and charging alone. In still further embodiments, synchronization/registration/pairing of components within the audio conferencing system can be done without any specific ports using, for example, a series of button presses or a controller, such as the handset dialer 106 discussed below. In addition, in some embodiments, an audio conferencing system can include a number of components that are pre-configured to function together, eliminating the need for any kind of synchronization/registration/pairing operations. Therefore, in many embodiments, the charger tray 104 is not in communication with the base unit in any way. Rather, the charger tray 104 can be located remotely from the base unit 102 and not be connected thereto. The charger tray 104 can instead simply provide for the storage and battery recharging of the one or more wireless communication modules that are in communication with the base unit 102. Accordingly, a person skilled in the art will appreciate that any combination and number of ports and wireless technologies or RF can be used to charge the communications modules and synchronize them with the base unit 102.

Figure 3:
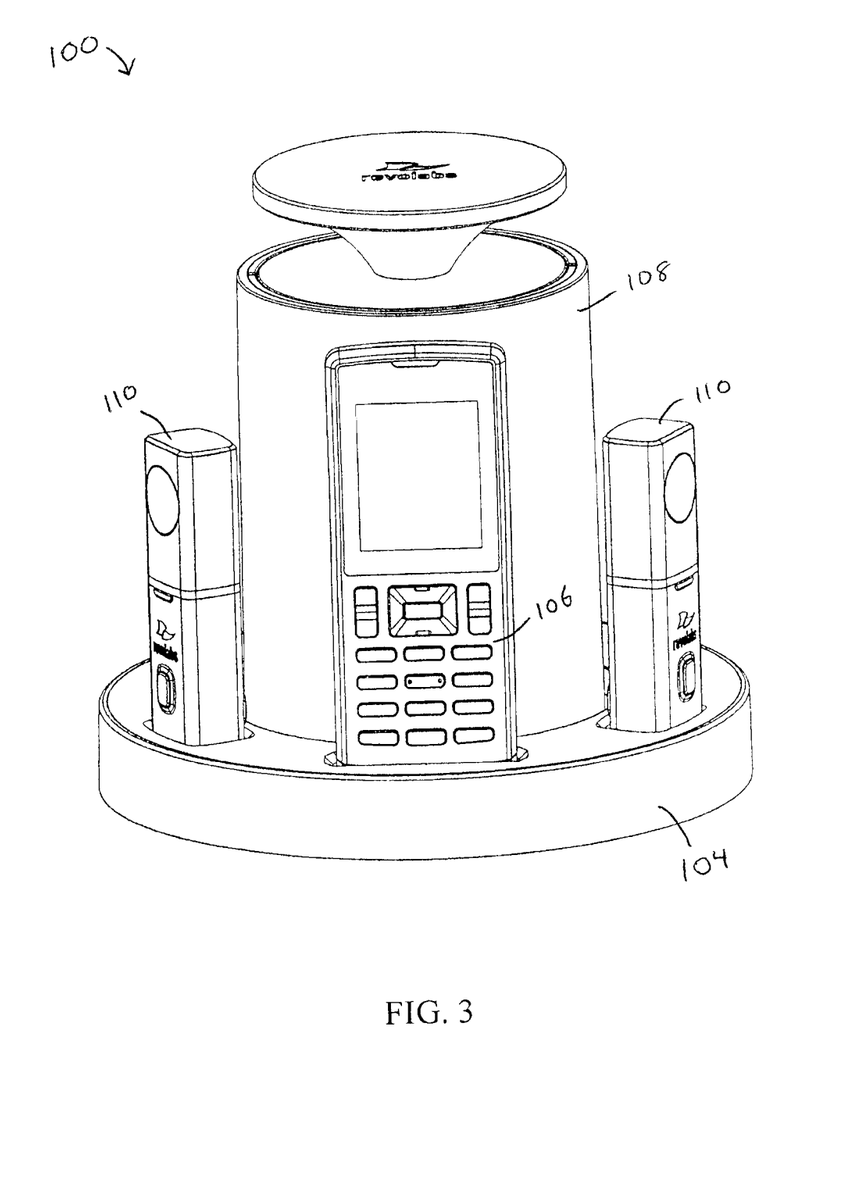
FIG. 3 is an illustration of the unified audio conferencing system of FIG. 1 with all wireless components in a charging tray.

FIG. 3 illustrates the wireless audio conferencing system 100 of FIG. 1 with each mobile communication device placed in a docking port 112 of the charger tray 104. In this configuration, the charger tray 104 can be connected to a power source and can provide charging for each of the components 106, 108, and 110. The charger tray 104 also provides an efficient storage mechanism when the system is not in use. Moreover, the charger tray 104 and the base unit 102 can each be modular, having the ability to append to additional base units and charger trays with additional ports to increase the number of communication modules associated with the wireless audio conferencing system 100. As discussed above, the embodiment of the charger tray 104 shown in FIG. 3 is not connected to the base unit 102 and can be located remotely therefrom.

Figure 4:
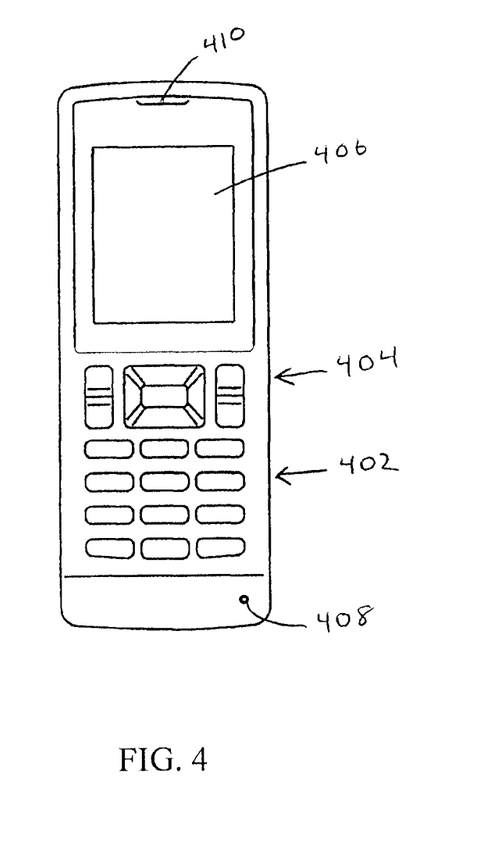
FIG. 4 is an illustration of a handset dialer of the unified audio conferencing system of FIG. 1.

The handset dialer 106 of the wireless audio conferencing system 100 can control the system, including managing the pairing of one or more wireless microphones and speakers, as well as the initiation and termination of, for example, telephone conferencing calls. The handset dialer can also be used independently of the wireless microphones and speakers to provide for private conversations, such as a two-party telephone call. To this end, the handset dialer can include a variety of interface and communication features. For example, the handset dialer 106 can include a dialer pad 402 for data entry, directional and selection buttons 404 for menu navigation, a display screen 406, a microphone 408 to collect sound, and a speaker 410 that can be held near a user's ear. The handset dialer 106 can also include a mute button to mute the handset 106, one or more visual indicators (not shown) separate from the screen 406, and a contact adapted to couple the handset dialer 106 to the charger tray 104.

Figure 5A:
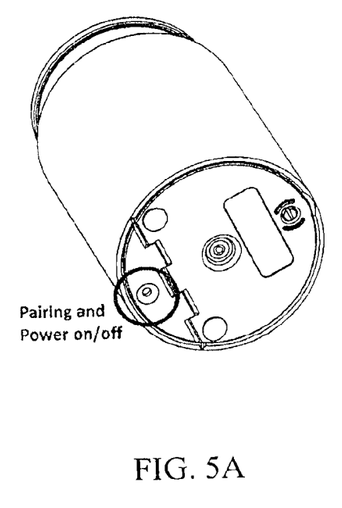
FIG. 5A is a bottom perspective view illustration of a wireless speaker of the unified audio conferencing system of FIG. 1.
Figure 5B:
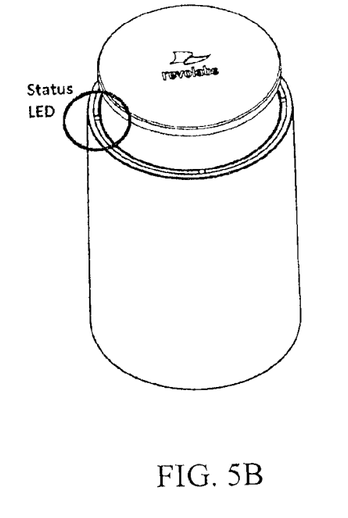
FIG. 5B is a top perspective view illustration of a wireless speaker of the unified audio conferencing system of FIG. 1.

The wireless audio conferencing system 100 can also include one or more wireless speakers 108. Each wireless speaker 108 can include a battery or other internal power source such that it can be removed from the charger tray 104 and placed at any of a variety of locations throughout the conferencing environment. FIGS. 5A and 5B illustrate top and bottom perspective views of the wireless speaker 108, respectively. As shown in FIG. 5A, the wireless speaker 108 can include a power/pairing button that can be used to power off the device or place it in a pairing mode for connection to a wireless audio conferencing system like system 100. Similarly, the pairing button can be used to add a second wireless speaker to a wireless audio conferencing system that already includes one wireless speaker. The bottom surface can also include a contact for receiving a charge when the wireless speaker 108 is placed in the charger tray 104. The top perspective view of FIG. 5B illustrates an omni-directional speaker and one or more status indicator lights that can be used to indicate, for example, mute status, battery status, call status, charging status, and pairing status.

By way of example only, the speaker 108 can have a roughly cylindrical shape and be approximately 157 mm tall and 93 mm in diameter. The speaker 108 can be capable of producing analog acoustic signals anywhere from about 120 to about 11,000 Hz. Furthermore, the wireless speaker 108 can communicate with the base unit 102 using a unique audio channel. As a result, the base unit 102 can selectively and independently communicate with the wireless speaker 108 (or with each of the wireless speakers if there are more than one). As mentioned above, the communication between the base unit 102 and the wireless speaker 108 over the unique audio channel can also be encrypted for further security.

Figures 6A, 6B, 6C:
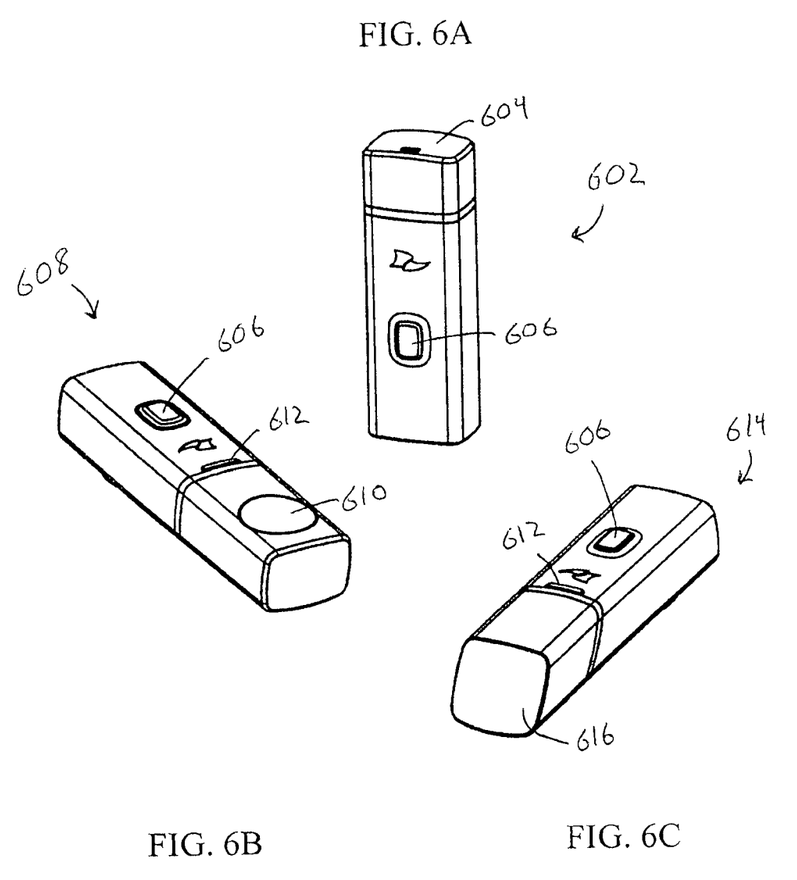
FIG. 6A is an illustration of a personal wireless microphone for use with a unified audio conferencing system.
FIG. 6B is an illustration of an omni-directional table-top wireless microphone for use with a unified audio conferencing system.
FIG. 6C is an illustration of a directional table-top wireless microphone for use with a unified audio conferencing system.

The wireless microphones 110 of the audio conferencing system 100 can also have a variety of forms. Three exemplary wireless microphones are illustrated in FIGS. 6A-6C. In particular, FIG. 6A illustrates a table-top microphone, FIG. 6B illustrates a wearable personal microphone module (PMM), and FIG. 6C illustrates a directional table-top microphone. Each of the various types of wireless microphone can include a highly directional or omni-directional microphone along with audio processing, as well as secure and reliable RF performance for communicating the detected acoustic signals to the base unit 102. Each wireless microphone can also include a mute button to mute the microphone and other features such as a visual indicator (e.g., an LED light), a contact disposed on the surface of the microphone that is adapted to coupled to the charger tray 104, and an audio output (e.g., a headphone jack) that allows the user to hear mixed audio when out of the hearing range of any wireless speakers 108.

For example, the wearable personal microphone module (PMM) 602 shown in FIG. 6A can include a highly directional microphone 604, a mute button 606, and can also include a user attachment component (e.g., a clip) to attach the PMM to a user. The table-top microphone 608 illustrated in FIG. 6B, by contrast, is meant to be placed on a table or flat surface near a cluster of conference users. For example, this microphone can be appropriate for use by about 6-10 people gathered around it. The microphone 608 includes an omni-directional microphone 610, mute button 606, and LED indicator light 612. FIG. 6C illustrates yet another embodiment of a wireless microphone 110, a directional table-top microphone 614. This microphone includes a directional microphone 616, as well as the same mute button 606 and indicator LED 612 described above. The microphone 608 can be particularly useful for groups of about 2-3 users sitting close together. Various types of wireless microphones that can be used with the system of the present invention are disclosed in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," and U.S. patent application Ser. No. 11/668,235 filed on Jan. 29, 2007, and entitled "Wireless Multi-User Audio System," each of which is incorporated by reference in their entirety above.

The various embodiments of wireless microphones 110 discussed above can include a variety of features. These include, for example, a range of up to 30 meters and an audio bandwidth of 80-11,000 Hz. As stated above, the various table-top microphones 608, 614 can collect sound in a variety of ways, including using directional and omni-directional patterns. Each wireless microphone 110 can also communicate with the base unit 102 using a unique audio channel, similar to the wireless speaker 108 discussed above. The use of a unique audio channel allows the base unit 102 to independently and selectively communicate with each wireless microphone 110. Further, the communication between the base unit 102 and each wireless microphone 110 can be encrypted using, for example, 128-bit proprietary encryption, thereby preventing others from eavesdropping on an audio conference.

Because each of the communication modules described above are independently wirelessly connected to the base unit 102, the communication modules can aid in the ability of individual users to participate in the audio conference. Further, because each of the individual communication modules of the unified audio conferencing system 100 can be wirelessly distributed throughout the range of the base unit (e.g., throughout a conference room), participants no longer have to huddle around a central table-top speakerphone. In addition to repositioning the communications modules depending on the needs of each phone call, additional communications modules can be included to increase the number of participants.

The following are operational features of certain embodiments of the audio conferencing system 100. It should be understood that the system described below can be used with any number or combination of wireless communication modules. The communication modules can each include a functionality that operates when the communication module is removed or inserted into the charger tray 104. For example, each of the wireless microphones 110 can automatically link to the base unit 102 by RF when removed from the charger tray 104. Further, if a wireless microphone is "registered"

with a base unit, a unique audio channel can be assigned to the microphone by the base unit. Conversely, for example, when a microphone is inserted into a charger tray, the microphone can automatically mute itself and/or shut down the RF link.

In this manner, each of the individual communication modules associated with the base unit 102 can be used, for example, to answer an incoming telephone call. Upon removing any one of the various communication modules (e.g., one of microphones 110, handset dialer 106, or table-top speaker 108) from its corresponding port in the charger tray 104, a telephone connection can be initiated with the caller through the removed communication module. In some embodiments, the dialer and one microphone must be removed to initiate a conference call. Otherwise, if the dialer alone is removed, a headset call using only the dialer can be initiated. In such an event, a subsequent removal of a wireless microphone from the charger tray 104 can convert the headset call into an audio conference.

Additionally, any of the various communication modules associated with the base unit 102 can answer an incoming telephone call by un-muting the audio input device (i.e., the microphone) associated with the communication modules. For example, in some embodiments, this can be accomplished by simply removing the communication module from the charger tray 104. In other embodiments, however, a device may need to be un-muted after removal from the charger tray 104 in order to answer an incoming call. For example, if a wireless microphone is already removed from the charger tray 104, a user will have to press the mute button on the wireless microphone to answer an incoming call. This is in contrast to the case where all wireless microphones are in the charger tray 104, and simply removing a microphone from the charger tray can answer an incoming call. Still further, additional communication modules associated with the base unit 102 can join the previously initiated conversation by subsequently being removed from the charger tray 104 or by un-muting the communications module that is already disengaged from the charger tray 104 at the time of the incoming call.

The existence of the base unit 102 coordinating communication with each of the wireless communication modules allows for powerful call management features as well. For example, during a call any user can mute all of the communication modules (i.e., all of the wireless microphones and the handset dialer 106) simply by pressing the mute button on the user's personal (or most closely located) microphone. Similarly, all microphones can be un-muted by a single push of the mute button on any of the communication modules. This feature allows, for example, a conference moderator to quickly have a private conversation without worrying about coordinating the manual muting of each of the communication modules that may be scattered throughout a large conference room or other environment.

The base unit 102 can also take appropriate action when each of the communication modules is replaced in the charger tray 104. For example, if the base unit 102 detects that each of the communication modules has been returned to the charger tray 104, the base unit 102 can terminate the audio conferencing session (e.g., hang up if on a telephone call). The base unit 102 can detect that the communication modules have been returned to the charger tray 104 by, for example, determining that the RF link to each communication module has been terminated. Accordingly, any ongoing telephone call or other audio conference can be terminated when the last communication module is replaced in the charger tray 104. In addition, regardless of the termination of any conference call, each communication module can be configured to mute itself when placed in the charger tray 104.

As will be appreciated by one skilled in the art, additional functionality can be attributed to the base unit 102, charger tray 104, and each of the communications modules, such as microphones 110. For example, once a call is initiated, the wireless microphone 110 can be automatically muted when removed from the charging tray 104 to allow a user to silently position or attach (e.g., in the case of wearable personal microphone modules) the microphone before going live with their audio. In other embodiments, the mute button of the one or more wireless communication modules can be configured to answer a call received when another call is already active. One skilled in the art will appreciate that any number of actions are possible, such as pressing once to switch to the incoming call, long pressing to conference the incoming call into the active call, and double-tapping to ignore the incoming call. These same options may also be controlled from the handset dialer 106.

Still further, in some embodiments, the base unit 102 can be configured to isolate, for example, two or more of the wireless microphones for a private conference. Due to the independent wireless connection between the base unit and each microphone, along with the use of unique audio channels, the base unit can be configured to selectively connect various channels to create two or more simultaneous audio conferences. For example, a properly configured base unit could operate two audio conferences in complete isolation by creating two groups that each include two or more microphones and one or more speakers.

Other examples of additional functionality such as a power save mode, a notification for being out of wireless range of the base finder, and wireless communication encryption are described in detail in U.S. patent application Ser. No. 11/360, 922 filed on Feb. 23, 2006, and entitled "Wireless Multi-User Audio System," U.S. patent application Ser. No. 11/563,292 filed on Nov. 27, 2006, and entitled "Wireless Multi-User Audio System," and U.S. patent application Ser. No. 11/668, 235 filed on Jan. 29, 2007, and entitled "Wireless Multi-User Audio System," all of which are incorporated by reference in their entirety above.

In many embodiments, the audio conferencing system of the present invention can be preconfigured with a plurality of mobile communication devices in association with a base unit. In such an embodiment, the individual component devices can be configured to automatically connect to the base unit comes preconfigured with the base unit upon activation. If the component devices are not preconfigured, however, it may be necessary to pair one or more devices with a base unit. This can be done in a variety of ways, as discussed above. One exemplary pairing procedure is provided below, but one skilled in the art will appreciate that many others are possible.

To pair a Microphone or a Speaker to the audio conferencing system, it can be necessary in some embodiments to pair a handset dialer first. If more than one component needs to be paired, or if a whole system needs to be paired, it can be beneficial in such cases to begin by pairing the base unit and handset dialer, as the dialer can be used to manage the pairing of the remaining components.

By way of example only, one method for pairing a handset dialer and base unit is as follows:
1. Turn off the handset dialer
2. Plug in the base unit
3. Turn the handset dialer on, the dialer can automatically begin scanning for a base unit 4. The handset dialer will detect the base a prompt for pairing
5. After confirmation, the dialer and base unit are paired To pair a wireless speaker or other component, the following general exemplary method can be followed:
1. Shut off the device by holding the power/pairing button
2. Using the handset dialer, select the device to be paired (speaker, microphone, etc.)
3. When the handset dialer displays a "pairing device" screen, press and hold the power/pairing button on the device until the indicator light turns solid red (indicating pairing mode)
4. After a short time an overlay will appear on the handset dialer indicating that pairing is complete As noted above, these procedures are provided by way of example only and one skilled in the art will appreciate that a variety of other pairing procedures can be employed to link any number of conferencing components with a base unit.

In other embodiments, the unified audio conferencing system can be utilized to provide audio during video conferencing. A standard video conferencing system can be used and its audio inputs and outputs can be connected to the base unit 102 in order to utilize the audio conferencing system of the present invention. Furthermore, cellular technology can be utilized along with the audio conferencing system via, for example, Bluetooth pairing between the base unit 102 and a cellular phone. Accordingly, the present invention discloses a truly unified communications and conferencing system that can interface with a variety of communication technologies and provide modular, adaptable, and high quality audio conferencing.

A person skilled in the art will appreciate that these types of systems can be used with a variety of wireless audio systems, including those described in U.S. patent application Ser. No. 11/360,922 filed on Feb. 23, 2006, and entitled "Wireless Multi-User Audio System," U.S. patent application Ser. No. 11/563,292 filed on Nov. 27, 2006, and entitled "Wireless Multi-User Audio System," and U.S. patent application Ser. No. 11/668,235 filed on Jan. 29, 2007, and entitled "Wireless Multi-User Audio System," all of which are incorporated by reference in their entirety above.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. A wireless audio conferencing system, comprising:
a base unit configured to interface with a plurality of external communication systems;
one or more wireless speakers;
one or more wireless microphones;
a handset configured to wirelessly control the base unit; and
a charger tray separate from the base unit and configured to removably store and recharge the one or more wireless speakers, the one or more wireless microphones, and the handset;
wherein the one or more wireless speakers and the one or more wireless microphones are configured to communicate with the base unit to provide audio conferencing between a plurality of users.

2. The system of claim 1, wherein each of the one or more wireless speakers and the one or more wireless microphones communicates with the base unit using a unique audio channel.

3. The system of claim 1, wherein the plurality of external communication systems is selected from the group consisting of analog telephones, VOIP telephones, cellular telephones, Ethernet, USB, video conferencing, and audio recording.

4. The system of claim 3, wherein the base unit is configured to interface with two or more of the plurality of external communication systems simultaneously.

5. The system of claim 1, wherein each of the handset and the one or more wireless microphones includes a mute button and wherein pressing the mute button on any one device mutes the handset and all of the one or more wireless microphones.

6. The system of claim 5, wherein the handset and all of the one or more wireless microphones can be un-muted by pressing the mute button on any one device.

7. The system of claim 1, wherein the system is configured to answer an incoming call if the handset or any of the one or more wireless microphones is removed from the charger tray while the incoming call is ringing.

8. The system of claim 7, wherein the system is configured to answer the incoming call if any of the one or more wireless microphones already removed from the charger tray is un-muted.

9. The system of claim 1, wherein the system is configured to terminate a call when the handset and each of the one or more wireless microphones is placed in the charger tray.

10. The system of claim 1, wherein the one or more wireless microphones are selected from the group consisting of a personal microphone, an omni-directional table-top microphone, and a directional table-top microphone.

11. The system of claim 10, wherein the one or more wireless microphones comprise four wireless microphones.

12. The system of claim 1, wherein the one or more wireless speakers comprise two wireless speakers.

13. A wireless audio conferencing system, comprising:
a base unit;
a plurality of wireless microphones;
one or more wireless speakers; and
a charger tray separate from the base unit and configured to removably store and recharge the plurality of wireless microphones and the one or more wireless speakers;
wherein the base unit is configured to wirelessly communicate with each of the plurality of wireless microphones and the one or more wireless speakers using a unique audio channel; and
wherein the base unit is configured to simultaneously connect a first portion of the plurality of wireless microphones to each other and connect a second portion of the plurality of wireless microphones to each other such that the first and second portions of the plurality of wireless microphones are not conferenced together.

14. A method of managing a wireless audio conferencing system, comprising:
determining if any of a plurality of wireless microphones is removed from a charger tray upon receipt of an incoming request for an audio conference;
initiating an audio conference through a handset if none of the plurality of wireless microphones is removed from the charger tray;
activating one or more wireless speakers and a wireless microphone upon removal of the wireless microphone from the charger tray; and terminating the audio conference when each of the plurality of wireless microphones is returned to the charger tray.

\* \* \* \* \*